United States Patent
Burk et al.

(10) Patent No.: US 6,425,261 B2
(45) Date of Patent: Jul. 30, 2002

(54) CONDENSER FOR A VEHICLE AIR-CONDITIONING SYSTEM

(75) Inventors: Roland Burk, Stuttgart; Hagen Mittelstrass, Bondorf; Karl-Heinz Staffa, Stuttgart, all of (DE)

(73) Assignee: Behr GmbH & Co., Stuttgart (DE)

( * ) Notice: Subject to any disclaimer, the term of this patent is extended or adjusted under 35 U.S.C. 154(b) by 0 days.

(21) Appl. No.: 09/833,620

(22) Filed: Apr. 13, 2001

(30) Foreign Application Priority Data

Apr. 14, 2000 (DE) .......................... 100 18 478

(51) Int. Cl.⁷ ............................... F25B 39/04
(52) U.S. Cl. ................. 62/506; 165/150; 165/152; 165/173
(58) Field of Search .............. 62/506, 509; 165/110, 165/140, 152, 153, 132, 173, 176, 150

(56) References Cited

U.S. PATENT DOCUMENTS

| | | | | |
|---|---|---|---|---|
| 4,825,941 A | * | 5/1989 | Hoshino et al. | 165/176 |
| 4,972,683 A | * | 11/1990 | Beatenbough | 165/110 |
| 5,036,909 A | * | 8/1991 | Whitehead et al. | 165/150 |
| 5,419,141 A | | 5/1995 | Burk | 62/474 |
| 5,537,839 A | | 7/1996 | Burk et al. | 62/474 |
| 5,813,249 A | * | 9/1998 | Matsuo et al. | 165/132 |
| 5,875,650 A | * | 3/1999 | Nobuta et al. | 165/132 |

FOREIGN PATENT DOCUMENTS

| | | | |
|---|---|---|---|
| DE | 197 53 641 | | 6/1998 |
| DE | 43 19 293 | | 8/1998 |
| DE | 198 30 329 | | 1/1999 |
| DE | 199 26 990 | | 12/1999 |
| DE | 92 19 200 | | 1/2000 |
| DE | 198 49 528 | | 5/2000 |
| EP | 0 886 113 | | 12/1998 |
| FR | 2 747 768 | | 10/1997 |
| FR | 2776759 | * | 3/1998 |
| FR | 2 776 759 | | 10/1999 |

* cited by examiner

*Primary Examiner*—William E. Tapolcai
*Assistant Examiner*—Mohammad M Ali
(74) *Attorney, Agent, or Firm*—Foley & Lardner

(57) ABSTRACT

In a condenser for an air-conditioning system, in particular for an air-conditioning system of a motor vehicle, there is provision for a collector (15) to be formed from a plurality of series-connected tubes (18) which extend between header tubes (10, 11) and the cross section of which is a multiple of the cross section of the flat tubes (13).

23 Claims, 4 Drawing Sheets

CONDENSER FOR A VEHICLE AIR-CONDITIONING SYSTEM

BACKGROUND OF THE INVENTION

The invention relates to a condenser for an air-conditioning system. In particular the invention relates to a condenser for an air-conditioning system of a motor vehicle. The condenser of the invention comprises lateral header tubes and a finned tube block. The finned tube block contains a section serving as a collector and comprises flat tubes and corrugated fins.

In a known condenser of the type disclosed in FR-A 2776 759, the collector is integrated as a reservoir into the finned tube block. In a first embodiment, a section of flat tubes which are connected in parallel and which correspond to the other flat tubes, serves as the collector. In another embodiment, the collector provided is only a single large-volume tube which projects beyond the contour of the condenser on at least one side. In further embodiments, flat tubes connected in parallel as well as an outer tube are provided. The outer tube is parallel to and has a larger cross section than the flat tubes. In this known construction, phase separation between liquid and vaporous refrigerant takes place in the section serving as a collector or reservoir. During transverse accelerations of the vehicle, for example, during cornering, the liquid level changes. These changes in liquid level may lead to an uneven cooling process or even to breakdowns in the cooling process, particularly when refrigerant has already been lost after a lengthy operating period. In a reservoir or collector of small cross-section flat tubes connected in parallel, the loss of refrigerant during lengthy operational periods is practically unavoidable. Even in the case of relatively low refrigerant losses, the losses lead to the displacement of supercooling to a relatively great extent, thereby impairing the cooling capacity of the air conditioning system. This displacement of supercooling may go so far that supercooling is no longer achieved at all within the condenser.

SUMMARY OF THE INVENTION

An object of the present invention is to provide an improved condenser, especially for use in automotive air-conditioning units.

A further object of the invention is to integrate a collector into the finned tube block of a condenser, in such a way that transverse accelerations have no effect on the cooling capacity and that refrigerant losses do not have too great an effect on condenser function.

In accomplishing the objects of the invention, there has been provided, according to one aspect of the invention, a condenser for an air-conditioning system comprising: a) a pair of headers; b) a finned tube block comprised of a plurality of flat tubes extending between the headers, wherein the tube block includes a plurality of first flat tubes having a first tube cross-section; and c) a collector integrated into the finned tube block, the collector comprising a plurality of second flat tubes having a second tube cross-section, wherein the second tube cross-section is a multiple of at least twice as large as the first tube cross-section, and wherein the second tubes are connected to the headers to provide serial flow through the second tubes.

Further objects, features and advantages of the invention will become apparent from the detailed description of preferred embodiments that follows, when considered together with the accompanying drawings.

DETAILED DESCRIPTION OF THE PREFERRED EMBODIMENTS

Figure 1:
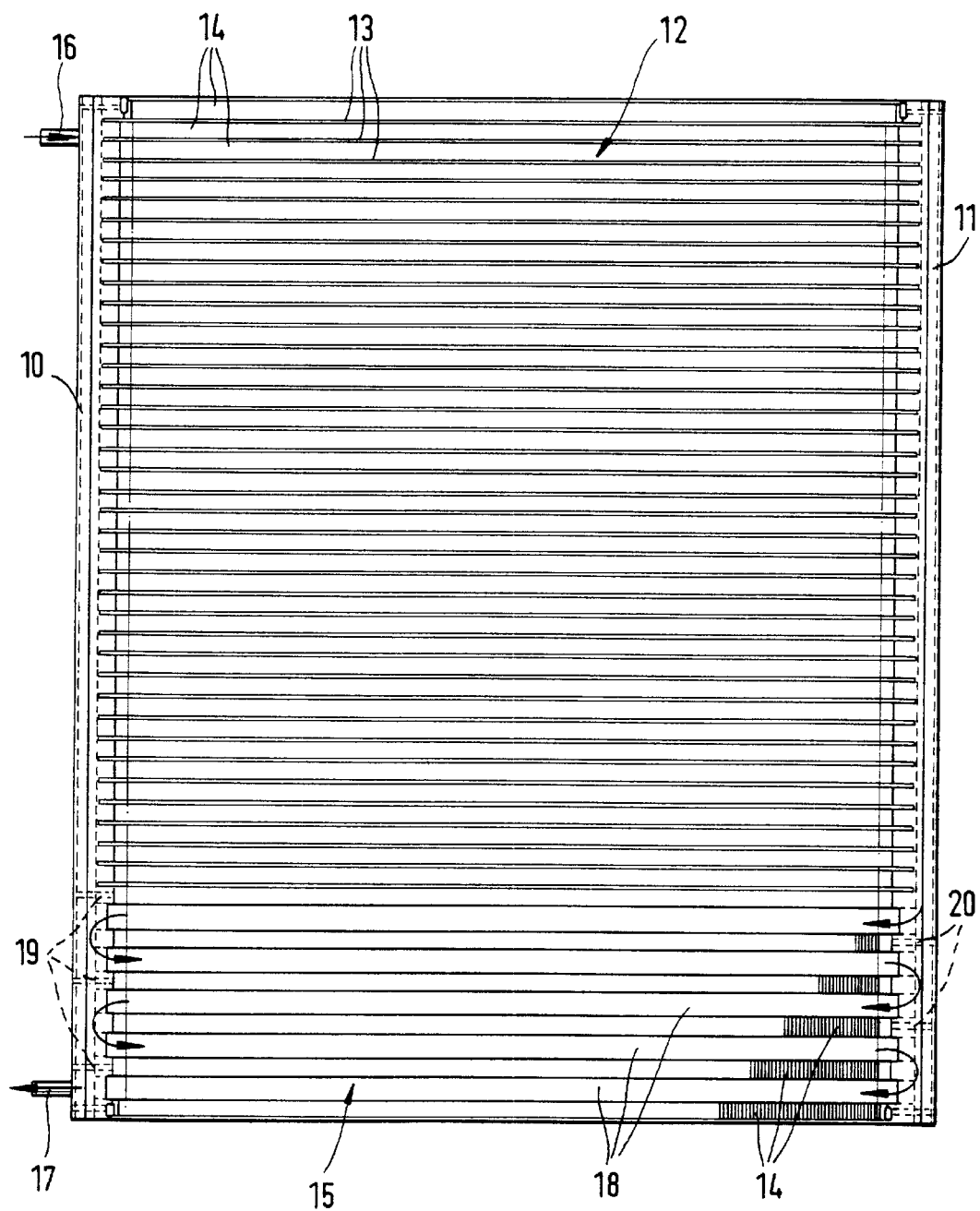
FIG. 1 shows a frontal view of a condenser according to the invention.

According to the invention a collector is formed from a plurality of tubes which are connected in a series and which extend between the header tubes. The cross section of the plurality of tubes is a multiple of the cross section of the other flat tubes.

The condenser design of the present invention deliberately dispenses with phase separation. Surprisingly, it was found that good functioning is maintained despite dispensing with phase separation. The present invention takes advantage of the fact that as warmth is extracted from the condensing refrigerant, the density of the two phase mixture changes significantly as it approaches the saturated liquid state. The large density gradient region ends at the point where condensation has ended and supercooling commences. The refrigerant buffer volume received in the collector is distributed to a plurality of tubes connected in a series. Depending on the position of the large density gradient region, this results in a sufficiently different filling of the condenser with refrigerant without displacing the boundary of the beginning of supercooling in the surface of the condenser to too great an extent. The collector simultaneously functions as a supercooling stage, when it can receive a large enough quantity liquid refrigerant, i.e., about 150 g to about 400 g depending on the size of the air conditioning system, and when air-side finning for heat dissipation is assigned to the volume of refrigerant.

In another embodiment of the invention, a supercooling stage with a plurality of flat tubes is provided following the collector. It is thereby possible to achieve a kind of plateau for supercooling.

In a further embodiment of the invention, the tubes of the collector are rectangular tubes with inner fins and/or with a plurality of walls forming sub-passageways. This improves compressive strength while simultaneously increasing the heat transmission surface in contact with the refrigerant.

According to an additional embodiment of the invention a supercooling stage following the collector and arranged above the collector is provided. It is thereby possible to shift the supercooling stage into a region of the frontal face of a vehicle which is not shielded by front-end structures, such as bumpers or the like.

In yet another embodiment of the invention, a condensation stage arranged below the collector is provided. This condensation stage is further arranged for a predetermined refrigerant flow direction going from the bottom toward the top. This provides the advantage that, without special design measures, the supercooling stage formed by the collector or the supercooling stage following the collector may be arranged at the top in a region through which the air flowing onto the frontal face of a vehicle or of the condenser flows effectively. The air flows effectively since this region is not covered by front-end structures, such as bumpers or the like.

Further features and advantages in the invention may be gathered from the following description of the exemplary preferred embodiments and accompanying drawings.

The condenser illustrated in FIG. 1 is designed as a so-called flat-tube condenser. It has two lateral header tubes 10, 11 which are assembled from sheet-metal profiles, as is known, for example, from DE 43 19 293 C2. A finned tube block 12 composed of flat tubes 13 and of corrugated fins 14 located between them is arranged between the header tubes 10, 11. The design of the condenser is, in this respect, essentially in accordance with the construction of DE 43 19 293 C2. The essential difference is that a collector arranged parallel to one of the header tubes 10, 11 has been dispensed with. Instead, collector 15 is integrated into the finned tube block 12 of the condenser as explained below.

The header tube 10 is provided, at the top, with a supply connection 16 for vaporous refrigerant and, in the region of its lower end, with a discharge connection 17 for liquid refrigerant. The vaporous refrigerant passes into the flat tubes 13 and increasingly condenses. About the lower fifth of the total height of the condenser is designed as a collector 15 which simultaneously fulfils the function of a supercooling stage. The region of the collector 15 is composed of large-volume tubes 18 which are connected in a series, i.e., through which the flow passes in a serpentine manner. For this purpose, the header tubes 10, 11 are subdivided respectively by transverse walls 19, 20. The tubes 18, which preferably have a cross section of the order of magnitude of five times to eight times the free cross section of the flat tubes 13, are sized in such a way that the collector can receive a sufficient quantity of liquid refrigerant, i.e., about 150 g to 400 g. Corrugated fins 14 are arranged between the tubes 18 for further condensation and supercooling of the refrigerant.

Figure 2:
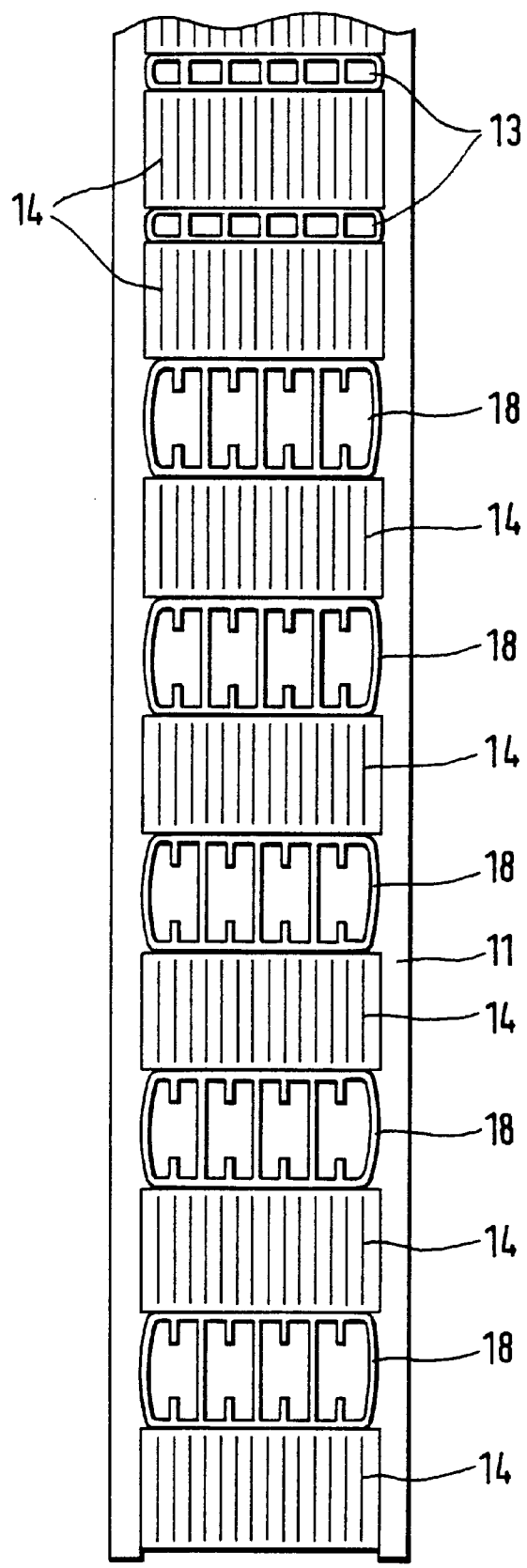
FIG. 2 shows a partial section through the region of a collector of the condenser of FIG. 1 on a larger scale.

The design according to the invention deliberately dispenses with phase separation, so that the tubes 18, in order to improve the compression strength and to increase the heat transmission surface, can be provided with a plurality of inner fins and/or chambers, as illustrated in FIG. 2.

The concept implemented by the present invention makes use of the fact that the density of the two-phase mixture changes significantly as heat is further extracted from the increasingly condensing refrigerant and as the saturated liquid state is approached. The region of the large density gradient ends at the point where condensation has ended and supercooling commences. Since the buffer volume is distributed to a plurality of tubes 18 of larger cross section and which are connected in series, this results in a sufficiently different filling of the condenser with the refrigerant, depending on the position of the region of the large density gradient. The boundary of the beginning of supercooling is displaced to a relatively slight extent within the finned condenser network.

Since phase separation has been deliberately dispensed with in the condenser design according to the invention, the entire condenser can be installed in a reversed configuration, such that the collector 15 is located at the top and the flow then passes through the condenser from the bottom upward. What is then achieved thereby is that the collector 15 and consequently, above all, the supercooling stage formed by the collector is located in the upper and usually better ventilated region. In this case, measures should be taken, by means of which liquid refrigerant is prevented from flowing back to the compressor after the latter has been switched off. For example, this may be achieved by a supply line 23' which leads from the compressor to the condenser in a siphon-like manner, as indicated by dashes in FIG. 3.

Figure 3:
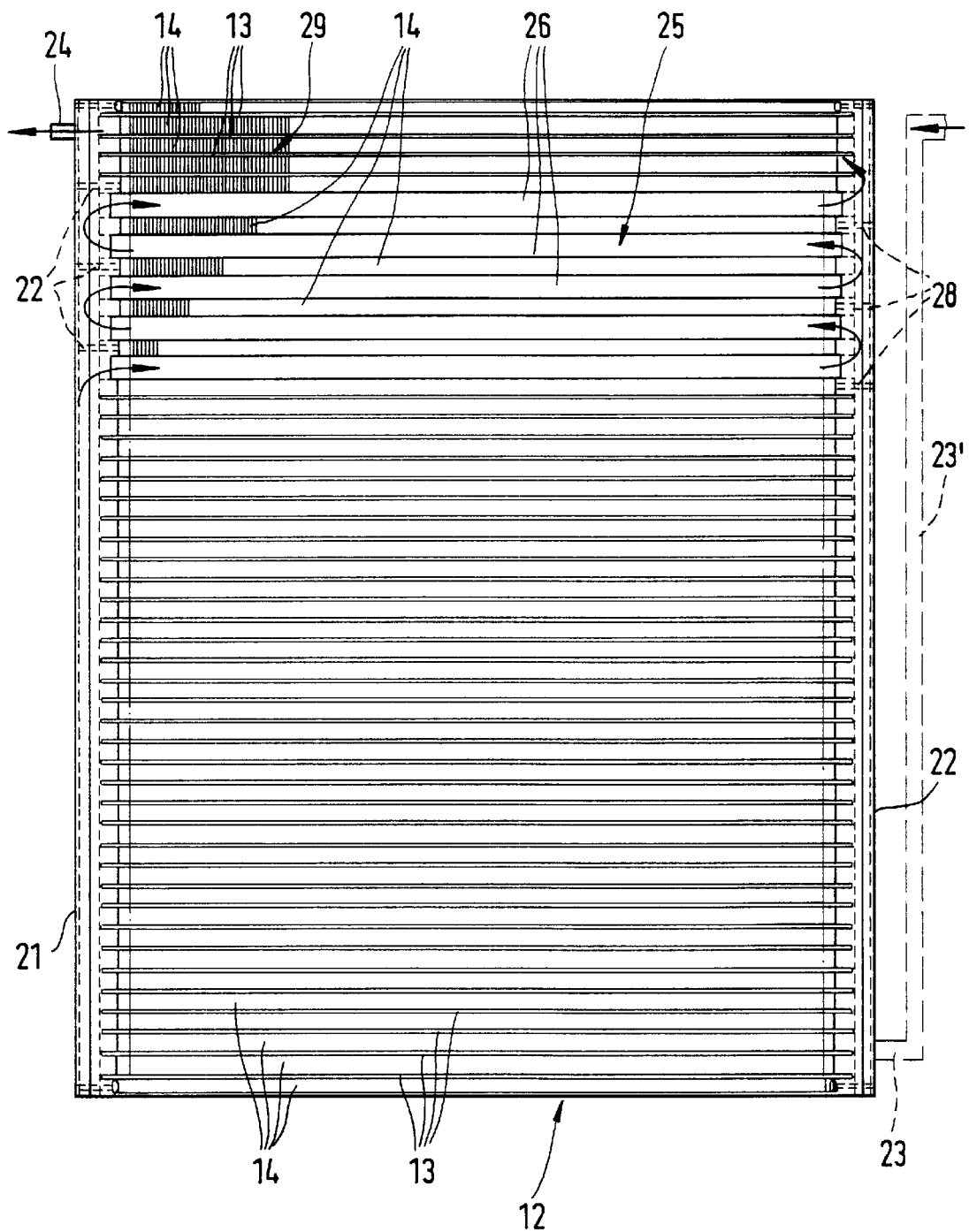
FIG. 3 shows a view of a condenser according to the invention, with a throughflow direction from bottom to top.

A condenser with a throughflow direction from the bottom upward is shown in FIG. 3. In this exemplary embodiment, a finned tube block 12 composed of flat tubes 13 and of corrugated fins 14 arranged between them is likewise provided between two header tubes 21, 22. The header tube 22 is provided at its lower end with an inflow 23 for vaporous refrigerant. The header tube 21 has at its upper end an outlet 24 for liquid supercooled refrigerant. The finned tube block 12 formed from flat tubes 13 and corrugated ribs 14 is followed by a collector 25 which is formed from a plurality of tubes 26 connected in series and corrugated fins 14 located between them. The header tubes 21, 22 are subdivided by transverse walls 27 and 28 in this region, in order to achieve a series connection of the tubes 26.

The collector 25 is followed by a supercooling stage 29 which is formed from a plurality of flat tubes 13 connected in parallel and corrugated fins 14 arranged between them.

Despite variation in the filling quantity, in order to obtain an obliquely plateau-like supercooling profile, it is expedient if half the air-side exchange surface of the collector and supercooling zone is provided with large-volume tubes 26 and half with small-volume flat tubes 13. The air-side heat exchange surface of the collector and supercooling region is typically between 15% and 25% and preferably about 20% of the entire air-side exchange surface of the condenser. The flow pass through the flat tubes 13 in parallel because of the smaller cross-sectional surface. The dimension of the cross section of the large-volume tubes 26 is such that the amount of refrigerant (difference in mass) contained in the collector represents a refrigerant fraction encompassing partially condensed refrigerant between supercooled liquid (no vapor fraction) and incompletely condensed refrigerant having a vapor fraction up to 15%, preferably from 10% to 15%. This represents the desired refrigerant buffer quantity and corresponds to the refrigerant in the region of the large density gradient. The calculation of this buffer quantity may be based on a density difference of about 0.7 kg/dm$^3$. In order to buffer a quantity of 250 g of refrigerant, a total volume of 333 cm$^3$ is then required for the collector. This total volume consists of the inner volumes of the tubes 26 and of the associated volume of the sections of the lateral header tubes 21, 22.

Figure 4:
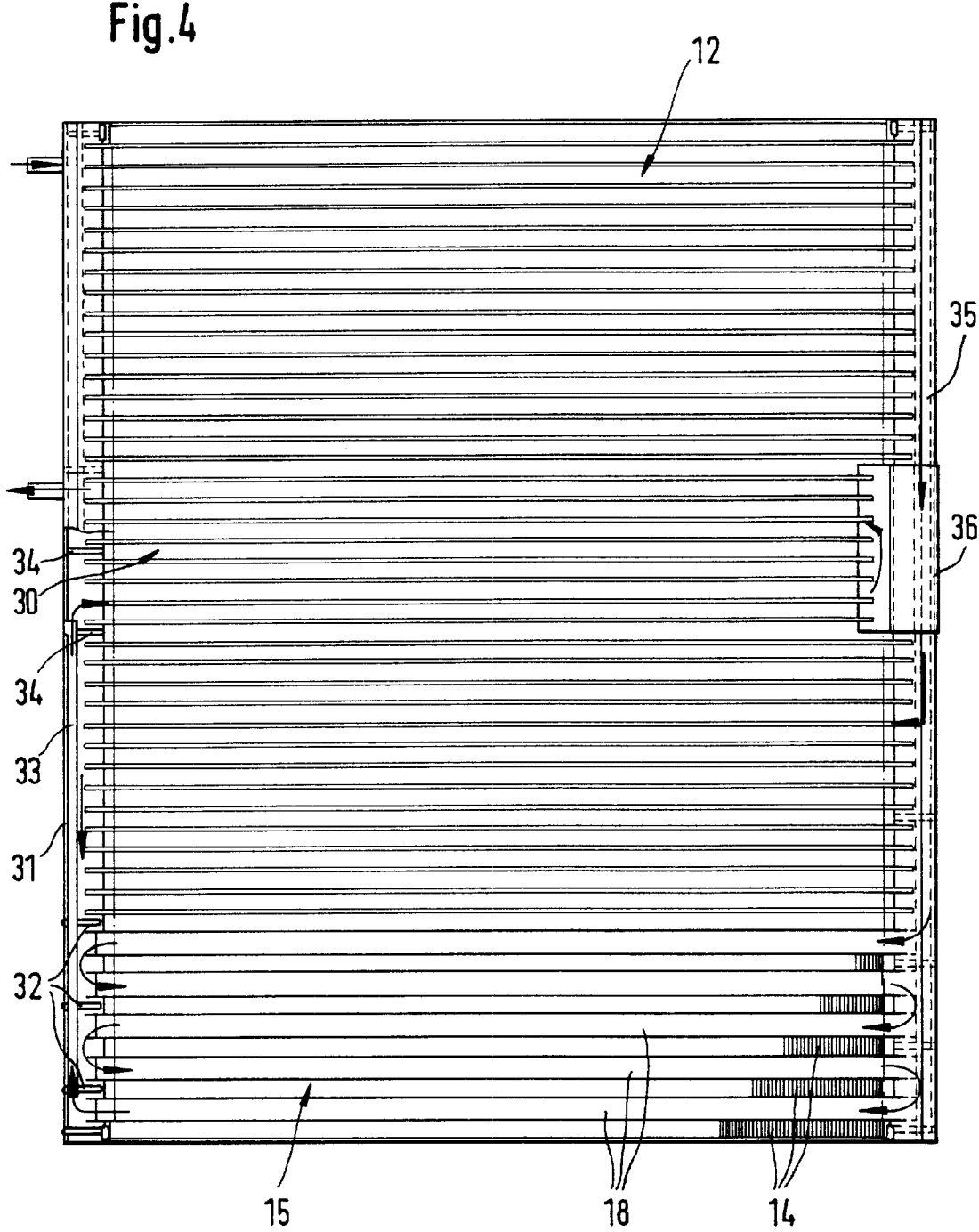
FIG. 4 shows a view of a condenser according to the invention with a supercooling stage arranged in the middle region.

The embodiment according to FIG. 4, also shows a condenser with a collector 15 integrated into the finned tube block 12. The collector 15, composed of the larger-volume tubes 18 with corrugated fins 14 located between them, is followed by a supercooling stage 30 with narrow flat tubes connected in parallel. This supercooling stage is connected to the collector 15 by means of bypass ducts and, in the exemplary embodiment, is located approximately at condenser mid-height. The height at which the supercooling stage 30 is arranged may be varied as desired, so that it can be placed at the point of best ventilation. In the header tube 31 on the left in the drawing, the partitions 32 arranged between the tubes 18 are pierced by a tube 33 leading to a section of the header tube 31 which is limited by partitions 34 and which is already an integral part of the supercooling stage 30.

The header tube 35, on the right in the drawing, possesses, in the region of the supercooling stage 30, a double-tube section 36, one tube of which continues the header tube 35, while the inner section receives the flat tubes of the supercooling stage 30. The same design concept of a refrigerant bypass may, of course, also be implemented on both sides of the condenser.

The disclosure of German Patent Application No. 100 18 478.2, filed Apr. 14, 2000, is hereby incorporated by reference in its entirety.

What is claimed is:

1. A condenser for an air-conditioning system comprising:
   a) a pair of headers;
   b) a finned tube block comprised of a plurality of flat tubes extending between said headers, wherein the tube block includes a plurality of first flat tubes having a first tube cross-section; and
   c) a collector integrated into said finned tube block, said collector comprising a plurality of second flat tubes having a second tube cross-section, wherein said second tube cross-section is a multiple of at least twice as large as said first tube cross-section, and wherein said second tubes are connected to the headers to provide serial flow through said second tubes.

2. A condenser for an air-conditioning system according to claim 1, wherein said finned tube block further comprises corrugated fins between said flat tubes.

3. A condenser for an air-conditioning system according to claim 1, wherein said plurality of first tubes are connected to the headers in parallel with one another.

4. A condenser for an air-conditioning system according to claim 1, wherein said cross section of said second tubes is five times to eight times greater than said cross section of said first tubes.

5. A condenser for an air-conditioning system according to claim 4, wherein said collector comprises a volume sufficient to contain from about 150 g to about 400 g of refrigerant.

6. A condenser for an air-conditioning system according to claim 1, wherein said headers comprise transverse walls subdividing said headers such that said plurality of second tubes are connected in series.

7. A condenser for an air-conditioning system according to claim 1, wherein said plurality of second tubes further comprise at least one of a plurality of internal ribs and internal dividing walls for forming sub-passageways, for improving compression strength and increasing heat transfer surface area.

8. A condenser for an air-conditioning system according to claim 1, wherein said plurality of second tubes are positioned below said plurality of first tubes.

9. A condenser for an air-conditioning system according to claim 1, wherein said plurality of second tubes are positioned above said plurality of first tubes.

10. A condenser for an air-conditioning system according to claim 9, wherein said finned tube block includes a condensation region comprised of said first tubes positioned below said plurality of second tubes, and wherein refrigerant passes through said tubes in a direction from bottom to top of the condenser.

11. A condenser for an air-conditioning system according to claim 1, wherein the finned tube block further comprises a supercooling region downstream of said collector.

12. A condenser for an air-conditioning system according to claim 11, wherein said supercooling region comprises a plurality of flat tubes connected in parallel to one another.

13. A condenser for an air-conditioning system according to claim 12, wherein said flat tubes of said supercooling region are of approximately the same dimension as said first tubes.

14. A condenser for an air-conditioning system according to claim 11, wherein said supercooling region is arranged in a middle portion of the condenser, the supercooling region is positioned above the plurality of second tubes and is connected to the plurality of second tubes by a bypass.

15. A condenser for an air-conditioning system according to claim 14, wherein said supercooling stage is positioned in said condenser at a point of optimum ventilation.

16. A condenser for an air-conditioning system according to claim 14, wherein said bypass comprises:
   a) transverse walls in one of said headers; and
   b) a tube passing through said transverse walls.

17. A condenser for an air-conditioning system according to claim 14, headers.

18. A condenser for an air-conditioning system according to claim 1, wherein the lateral dimension of said second tubes is approximately the same size as the lateral dimension of said first tubes.

19. A condenser for an air-conditioning system according to claim 11, wherein said collector has a volume sufficient to contain an amount of refrigerant encompassing a refrigerant fraction between supercooled refrigerant containing essentially no vapor and incompletely condensed refrigerant containing a vapor fraction of up to about 15%.

20. A condenser for an air-conditioning system according to claim 11, wherein said collector and supercooling region have an air-side exchange surface that comprises between 15% and 25% of the entire air-side exchange surface of the condenser.

21. A condenser for an air-conditioning system according to claim 20, wherein said collector and supercooling region air-side exchange surface comprises 20% of the entire air-side exchange surface.

22. A condenser for an air-conditioning system according to claim 9, further comprising means for preventing refrigerant from flowing back out of said collector to a compressor.

23. A condenser for an air-conditioning system according to claim 1, wherein said air-conditioning system comprises a motor vehicle air-conditioning system.

* * * * *